United States Patent
Ammann et al.

(10) Patent No.: US 8,021,105 B2
(45) Date of Patent: Sep. 20, 2011

(54) HYDRODYNAMIC AXIAL BEARING

(75) Inventors: Bruno Ammann, Aarau (CH); Markus Lebong, Niederrohrdorf (CH); Marco Di Pietro, Oftringen (CH)

(73) Assignee: ABB Turbo Systems AG, Baden (CH)

( * ) Notice: Subject to any disclaimer, the term of this patent is extended or adjusted under 35 U.S.C. 154(b) by 0 days.

(21) Appl. No.: 12/748,017

(22) Filed: Mar. 26, 2010

(65) Prior Publication Data

US 2010/0178166 A1 Jul. 15, 2010

Related U.S. Application Data

(63) Continuation of application No. PCT/EP2008/062878, filed on Sep. 25, 2008.

(30) Foreign Application Priority Data

Sep. 26, 2007 (EP) ..................................... 07117287

(51) Int. Cl.
F04D 29/047 (2006.01)
(52) U.S. Cl. ......... 415/104; 415/111; 384/123; 384/368
(58) Field of Classification Search .................. 415/104, 415/107, 111; 417/365; 384/121, 123, 425, 384/590, 368
See application file for complete search history.

(56) References Cited

U.S. PATENT DOCUMENTS

| | | | |
|---|---|---|---|
| 3,370,897 A | 2/1968 | Rylatt | |
| 6,024,495 A | 2/2000 | Loos et al. | |
| 6,467,963 B2 * | 10/2002 | Sakuragi et al. | 384/107 |
| 6,585,418 B2 | 7/2003 | Ammann et al. | |
| 6,836,040 B2 * | 12/2004 | Watanabe et al. | 310/90 |
| 6,962,443 B2 * | 11/2005 | Gomyo | 384/123 |
| 2004/0136625 A1 * | 7/2004 | Asada et al. | 384/107 |
| 2005/0069232 A1 | 3/2005 | Aiello et al. | |
| 2006/0140520 A1 | 6/2006 | Aiello et al. | |
| 2006/0165325 A1 | 7/2006 | Link et al. | |

FOREIGN PATENT DOCUMENTS

| | | |
|---|---|---|
| EP | 0 840 027 B1 | 12/2001 |
| EP | 1 199 486 B1 | 3/2005 |
| EP | 1 644 647 B1 | 10/2006 |
| GB | 1095999 | 12/1967 |
| JP | 2003-222123 A | 8/2003 |
| JP | 2006-077871 A | 3/2006 |

OTHER PUBLICATIONS

International Search Report (PCT/ISA/210) for PCT/EP2008/062878 dated Feb. 2, 2009.
European Search Report for EP 07117287.8 dated Jan. 21, 2008.
Notification Concerning Transmittal of International Preliminary Report on Patentability (Forms PCT/IB/326 and PCT/IB/373) and the Written Opinion of the International Searching Authority (Form PCT/ISA/237) issued in corresponding International Application No. PCT/EP2008/062878 dated Apr. 8, 2010 and an English Translation (Forms PCT/IB/338, PCT/IB/373 and PCT/ISA/237) dated May 6, 2010.

* cited by examiner

*Primary Examiner* — Ninh H Nguyen
(74) *Attorney, Agent, or Firm* — Buchanan Ingersoll & Rooney PC

(57) ABSTRACT

A hydrodynamic axial bearing with a floating disk is disclosed wherein two lubricating gaps on the two sides of the floating disk are formed by supporting surfaces of different size. This makes it possible to provide identical lubricating gaps on both sides, despite different rotation speeds between the floating disk and the bearing housing, and between the floating disk and the bearing comb.

18 Claims, 3 Drawing Sheets

HYDRODYNAMIC AXIAL BEARING

RELATED APPLICATIONS

This application claims priority as a continuation application under 35 U.S.C. §120 to PCT/EP2008/062878, which was filed as an International Application on Sep. 25, 2008 designating the U.S., and which claims priority to European Application 07117287.8 filed in Europe on Sep. 26, 2007. The entire contents of these applications are hereby incorporated by reference in their entireties.

FIELD

The disclosure relates to hydrodynamic axial bearings for rotating shafts, such as those used in exhaust-gas turbochargers and/or those having a floating disk.

BACKGROUND INFORMATION

Load-bearing axial bearings are used when axial thrust forces are applied to rotors which rotate at high speed. In the case of exhaust-gas turbochargers by way of example, hydrodynamic axial bearings are used to absorb high axial forces resulting from the flow, and to guide the turbine shaft in the axial direction. To compensate for incline positions and the wear behavior in applications such as these, free-floating disks, so-called floating disks, can be used between a bearing comb, which rotates at the shaft rotation speed, and a bearing housing, which does not rotate, in hydrodynamic axial bearings.

Examples relating to this can be found, inter alia, in GB1095999, EP0840027, EP1199486 and EP1644647, the disclosures of which are all incorporated herein by reference in their entireties. The floating disk is radially guided either on the rotating body, that is to say on the shaft or on the bearing comb by a radial bearing which is integrated in the floating disk, for example as disclosed in EP0840027, or on a stationary bearing collar, which concentrically surrounds the rotating body, for example as disclosed in EP1199486. A hydrodynamic axial bearing such as this can be lubricated by lubricating oil from a dedicated lubricating-oil system or, in the case of exhaust-gas turbochargers, via the lubricating-oil system of an internal combustion engine which is connected to the exhaust-gas turbocharger.

During operation, a load-bearing lubricating film is formed between the floating disk, which rotates at only about half the shaft rotation speed, and the shaft or the bearing comb which is arranged on the shaft. Profiled annular surfaces can be provided for this purpose on both sides of the floating disk and form the lubricating gap in each case together with one smooth sliding surface. The profiled annular surfaces include wedge surfaces which are oriented at least in the circumferential direction and which, together with the smooth sliding surfaces, form a converging gap. If sufficient lubricant is drawn into this converging gap, the load-bearing lubricating film is formed. The lubricant propagates in the radial direction because of the effect of the centrifugal force from the floating disk, which is rotating at high speed.

The friction moments on the axial and radial sliding surfaces of the floating disk can influence the rotation speed of the floating disk. At high shaft rotation speeds (e.g., less than 50% of the shaft rotating speed), the floating disk rotates less than half as fast as the shaft. This can result in different relative speeds in the two axial lubricating gaps. The relative speed of the shaft with respect to the floating disk is in this case greater than the relative speed of the floating disk with respect to the bearing housing.

The gap heights which occur in the two axial lubricating gaps are of different magnitude, because of the different relative speeds and the different centrifugal-force effects. Because the bearing size is designed for the smallest lubricating gap that in each case occurs, one bearing gap is overdesigned, and this can lead to an unnecessarily high power loss and to an unnecessarily high oil throughput.

SUMMARY

A hydrodynamic axial bearing is disclosed for a rotable shaft is mounted, comprising: a bearing housing; a floating disk arranged axially between the bearing housing and a bearing comb; and a lubricating gap bounded by a profiled annular surface and a sliding surface formed between the bearing housing and the floating disk, and the floating disk and the bearing comb, wherein each profiled annular surfaces includes plural wedge surfaces which each narrow the lubricating gap in a circumferential direction, wherein each lubricating gap formed by a profiled annular surface and a sliding surface on two sides of the floating disk have different geometric dimensions relative to one another.

An exhaust-gas turbocharger is disclosed, comprising: a rotatable shaft; and a hydrodynamic axial bearing for the rotatable shaft, the hydrodynamic axial bearing including: a bearing housing; a floating disk arranged axially between the bearing housing and a bearing comb; and a lubricating gap bounded by a profiled annular surface and a sliding surface formed between the bearing housing and the floating disk, and the floating disk and the bearing comb, wherein each profiled annular surfaces includes plural wedge surfaces which each narrow the lubricating gap in a circumferential direction, wherein each lubricating gap formed by a profiled annular surface and a sliding surface on two sides of the floating disk have different geometric dimensions relative to one another.

A floating disk is disclosed for placement in a hydrodynamic axial bearing between a bearing housing and a shaft mounted to rotate in the bearing housing, the floating disk comprising: a profiled annular surface with plural wedge surfaces on each of its two sides, each wedge surface being configured to narrow a lubricating gap between the floating disk and a sliding surface in a circumferential direction, wherein each lubricating gap formed by a profiled annular surface and a sliding surface on the two sides of the floating disk has different geometric dimensions relative to another of the lubricating gaps.

BRIEF DESCRIPTION OF THE DRAWINGS

Exemplary embodiments of the disclosure will be explained in more detail in the following text with reference to the drawings, in which.

DETAILED DESCRIPTION

Figure 1:
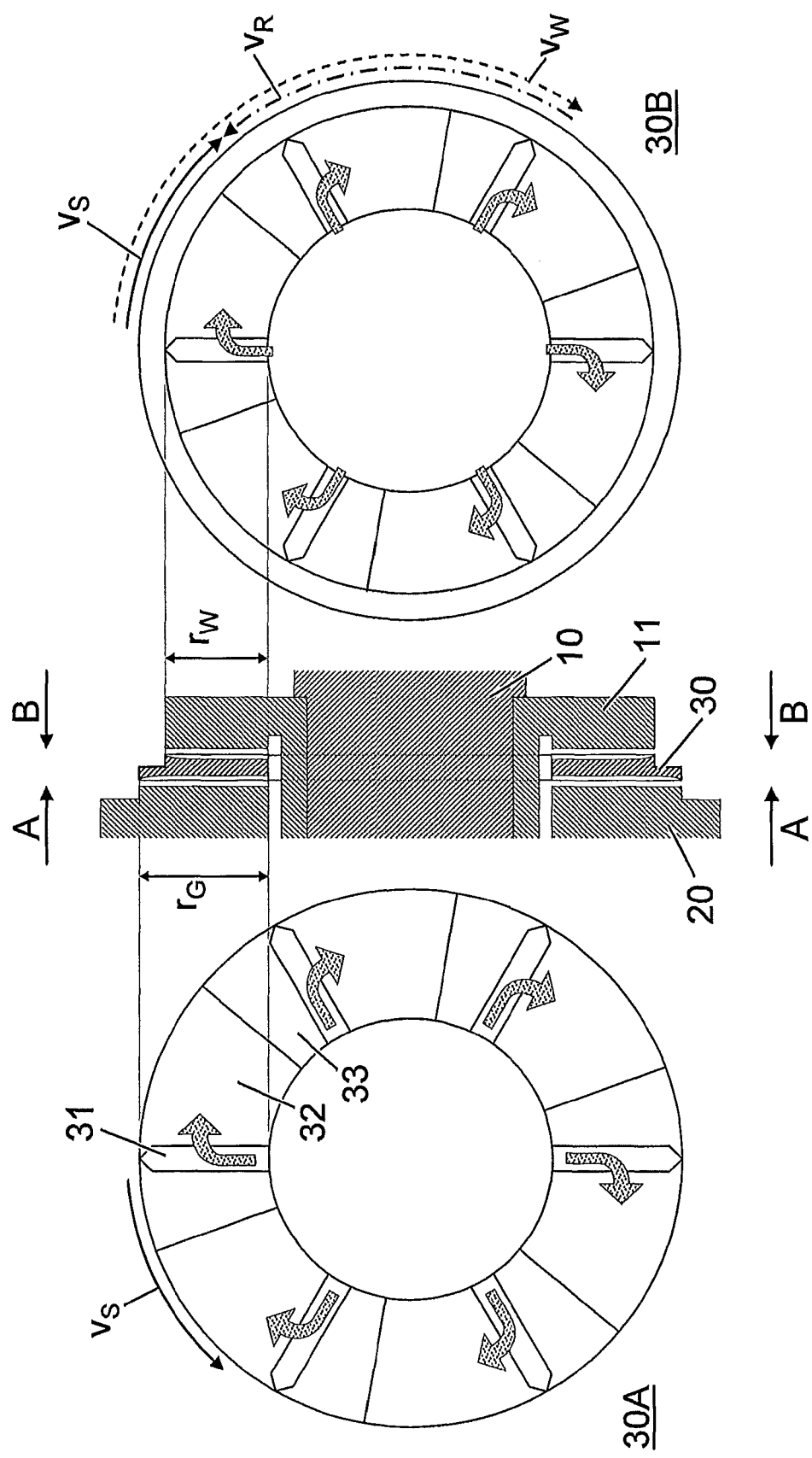
FIG. 1 shows an exemplary embodiment of an axial journal bearing configured according to the disclosure and having a stepped floating disk.

Exemplary embodiments disclosed herein can optimize power loss and oil throughput for a hydrodynamic axial bearing with a floating disk.

For example, according to the disclosure, two bearing gaps on two sides of the floating disk have supporting capabilities of different magnitude, thus resulting in minimum lubricating gaps being the same at the design point. The supporting capability of a bearing can be defined as the supporting force as a function of the rotation speed, the minimum lubricating gap and the oil characteristics.

According to the disclosure, the different supporting capability can be achieved by lubricating gaps of different geometric design (i.e., configuration). For example, the lubricating gap can be defined as an area bounded by a profiled annular surface and a smooth sliding surface between the components which form the axial bearing, that is to say between the bearing housing and the floating disk on one side, and the floating disk and the bearing comb, which rotates with the shaft, on the other side.

A radial step on the floating disk makes it possible to, for example, individually design surfaces of the two axial lubricating gaps in such a way that a minimum gap height in the two lubricating gaps is of a same magnitude at the design point. In this case, that side of the floating disk which faces the bearing housing can be equipped with a larger supporting surface than the side facing the bearing comb.

The size of at least one of the profiled circular surfaces can also be reduced by shortening it radially. In this case, the shortening can be carried out any or more of radially internally, radially externally or radially internally and externally.

A supporting surface of the axial bearing can be defined as a profiled annular surface and a smooth sliding surface which together form the lubricating gap. The size of the supporting surface can also reduce, for example, when only one of the two profiled annular surfaces is shortened in the radial direction, while the smooth sliding surfaces have the same dimensions. The same effect can be achieved when two profiled annular surfaces of the same size interact with smooth sliding surfaces, one of which does not extend over the entire annular surface for example in the radial direction.

A variation in the supporting capability can also be achieved by a geometric change to the profile in the circumferential direction. For example, the number of segments may be reduced from six to five. Alternatively, the extent of the oil grooves in the circumferential direction can be increased.

Exemplary embodiments can make it possible to compensate for minimal lubricating-gap heights on both sides of the floating disk, despite different relative speeds between the floating disk and the bearing housing on the one side and the floating disk and the bearing comb on the other side.

Alternatively, one or both sides of the floating disk may be in the form of a smooth sliding surface, and the profiled annular surface may be arranged on the shaft and/or the bearing comb. By way of example, if the side of the floating disk which faces the shaft is in the form of a smooth sliding surface and the annular surface is profiled to correspond to the shaft, annular surfaces, which rotate at higher speed, can each be profiled from both bearing parts.

Figure 2:
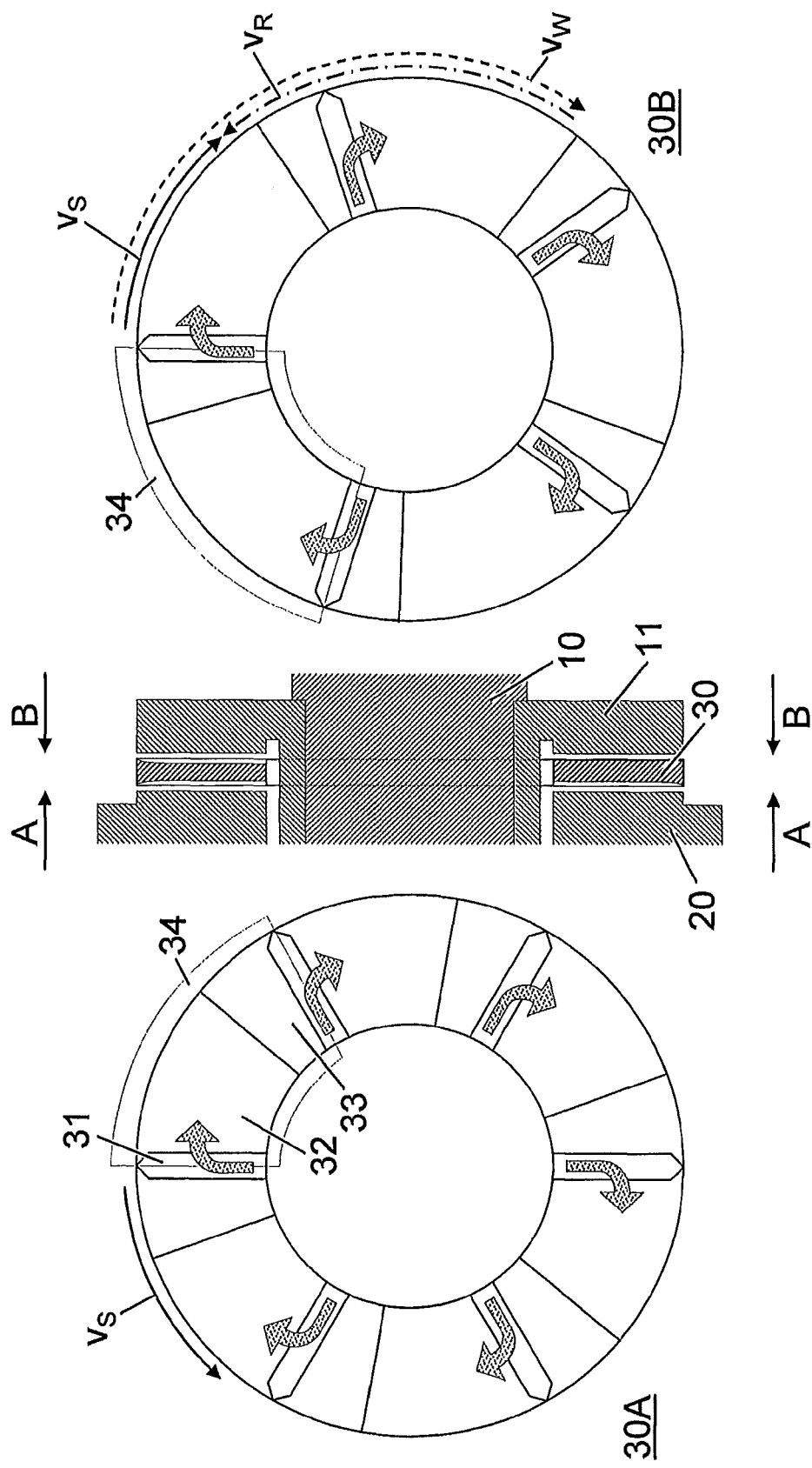
FIG. 2 shows another exemplary embodiment of an axial journal bearing configured according to the disclosure and having a floating disk with differently profiled annular surfaces.

FIG. 1 and FIG. 2 show two exemplary embodiments of a hydrodynamic axial bearing according to the disclosure, with a center of each of the figures showing a section along a shaft axis through the axial bearing. The axial bearing includes a floating disk 30 which is arranged axially between the bearing housing 20 and a bearing comb 11, which is arranged on a shaft 10 and rotates with the shaft. Optionally, the bearing comb may be integrated in the shaft as a radially protruding projection, resulting in the floating disk being arranged axially between the bearing housing and the shaft projection. The left-hand and right-hand areas of each of the figures show a view of the floating disk from the respective side. The left-hand side shows the floating disk 30A viewed in the direction A, and the right-hand side shows the floating disk 30B viewed in the direction B.

The profiled annular surface of the floating disk 30A facing the bearing housing rotates at the absolute speed $v_S$, that is to say in a counterclockwise direction when viewed in the direction A in the illustrated embodiment. In this case, the lubricating oil which is introduced radially via lubricating grooves 31 into the area of the profiled annular surface of the floating disk between the floating disk 30 and the bearing housing 20, as indicated by the broad arrows, is drawn into the wedge surfaces 32 in the opposite direction to the rotation direction of the floating disk. The pressure for the supporting capability of the axial bearing is built up by the narrowing of the lubricating gap between the wedge surfaces 32 and the opposite smooth sliding surface on the bearing housing. The greatest pressure results in the area of the transition from the wedge surface 32 to the latching surface 33.

The profiled annular surface of the floating disk 30B facing the bearing comb rotates at the absolute speed $v_S$, in the clockwise direction when viewed in the direction B in the illustrated embodiment. However, since the bearing comb 11 rotates in the same direction at more than twice the speed $v_W$, this results in a relative speed of the profiled annular surface $v_R$, which runs counterclockwise, when considered in the direction B. The relative speed $v_R$ is in this case greater than the absolute speed $v_S$. Once again, the broad arrows indicate how the lubricating oil is carried radially outward via the lubricating grooves, and in the process is drawn into the wedge surfaces in the circumferential direction.

In the exemplary embodiment shown in FIG. 1, the floating disk 30 has a radial step, as a result of which the side facing the bearing housing 20 projects in the radial direction beyond the side facing the bearing comb 11. The radial extents of the two sides of the floating disk are therefore different. The profiled annular surface on the side facing the bearing housing has an annular width $r_G$ which is greater than the annular width $r_W$ of the annular surface on the side of the floating disk facing the bearing comb.

Because of the higher relative speed with which the wedge surfaces of the profiled annular surface rotate along the smooth sliding surface on the bearing comb on the side of the floating disk facing the bearing comb, a lubricating gap is formed, despite the smaller supporting area, which corresponds to that between the bearing housing and the side of the floating disk facing the bearing housing.

In the exemplary embodiment shown in FIG. 2, the floating disk 30 has two sides of equal size, but whose profiled annular surfaces are different. The profiled annular surface is subdivided into a plurality of segments 34, wherein one segment includes a lubricating groove 31, a wedge surface 32 and an adjacent latching surface 33. The annular surface, which rotates more slowly in comparison to the stationary bearing housing, on the left-hand side has a greater number of segments 34 than the annular surface, which rotates at a higher relative speed, on the side facing the bearing comb.

The supporting capability can optionally be varied for example by varying the inclination angle of the wedge surface, thus making the area of the greatest supporting force smaller or larger. The transition between the wedge surface 32 and the latching surface 33 can be provided by, for example, means of an edge, or as a continuously running surface without an edge. In the latter case, there is no need for any difference between the wedge surface and the latching surface, as a result of which, for example, the wedge surface can also rise continuously, at an angle which becomes continually smaller, as far as the next lubricating groove.

Figure 3:
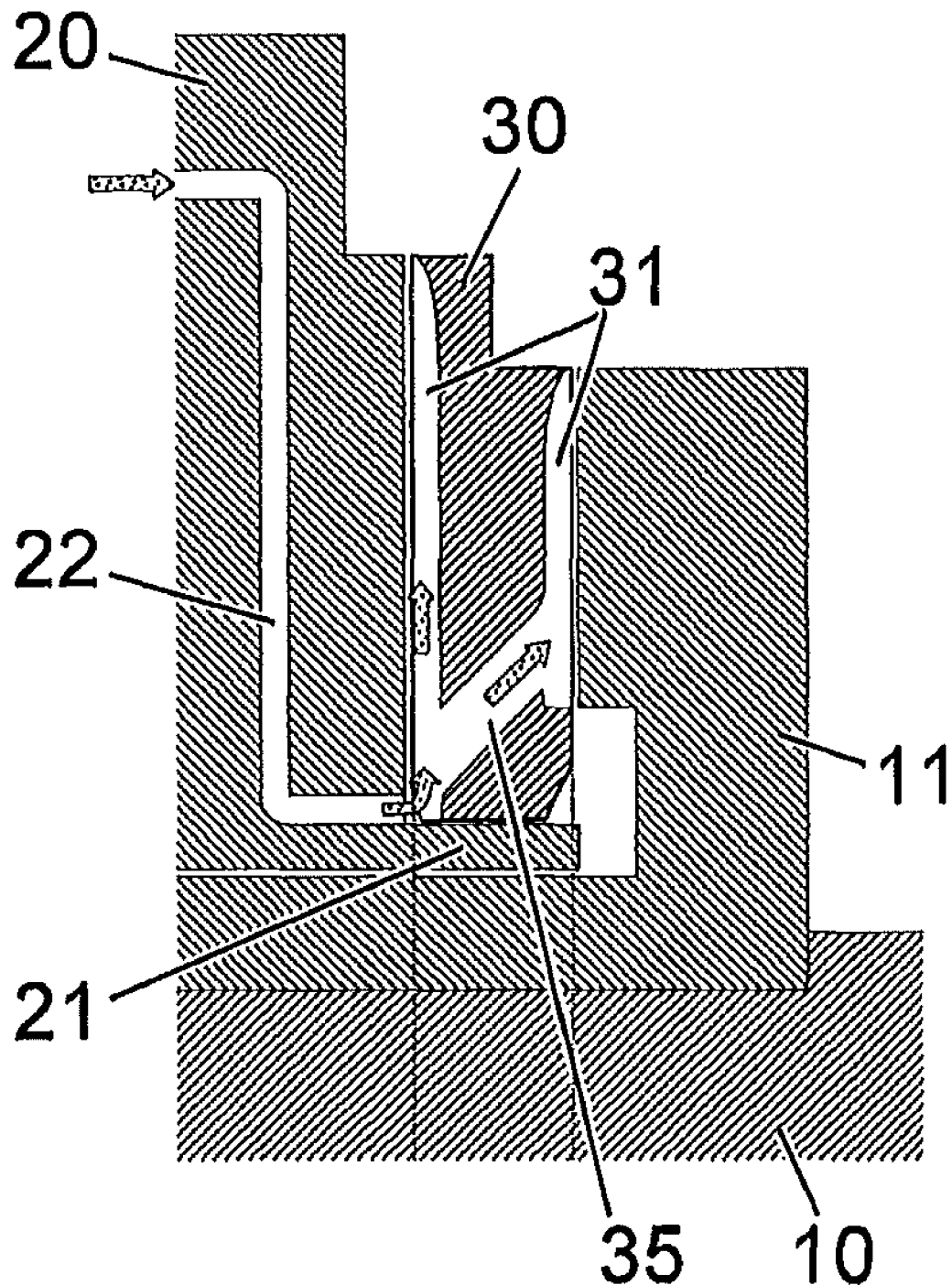
FIG. 3 shows a section through the lubricating-oil supply for another exemplary embodiment of an axial journal bearing configured according to the disclosure and having a stepped floating disk.

In the exemplary embodiment shown in FIG. 3, the floating disk 30 once again has a radial step, as a result of which the side facing the bearing housing 20 projects in the radial direction beyond the side facing the bearing comb 11. In addition, an incline is applied on the radially inner side of the side facing the bearing comb, and the internal radius of the profiled annular surface is enlarged somewhat outward. The inner edge of the smooth sliding surface on the bearing comb is offset radially outward, thus additionally reducing the supporting area of the lubricating gap between the floating disk 30 and the bearing comb 11, in comparison to the first embodiment.

Both sides of a floating disk for a hydrodynamic axial bearing can be supplied with lubricating oil. According to the disclosure, at least one supply hole 35 is incorporated in the floating disk for this purpose. The supply hole 35 connects the two sides of the floating disk, and allows lubricating oil to be supplied from one side to the other. Optionally, the floating disk has a supply hole for each lubricating groove on the side facing the bearing comb.

In the illustrated exemplary embodiment, the lubricating oil is passed via a lubricating oil supply line 22 in the bearing housing into the area of the lubricating gap between the floating disk 30 and the bearing housing 20. The rotation of the profiled annular surface feeds the lubricating oil along the lubricating grooves 31 radially outward, and in the process draws it into the wedge surfaces in the circumferential direction. The lubricating oil is also fed via the supply holes 35, which are arranged in the area of the lubricating grooves 31, into the area of the lubricating gap between the floating disk 30 and the bearing comb 11. If, in this case, starting from the lubricating gap, the supply holes with the lubricating-oil supply are directed at an angle toward the outer edge, rather than in the axial direction, the lubricating-oil flow is assisted by the rotation of the floating disk.

The supply hole means that there is, for example, no need for any supply grooves in the area of the radial bearing of the floating disk. This can reduce the lubricating-oil throughput through the decoupling gap between the bearing comb 11 and the bearing collar 21, which is present when the floating disk 30 is borne on the stationary bearing housing. This can be desirable when, for example, the decoupling gap leads into the injection-oil area, for example of the exhaust-gas turbocharger, in the area of the radial bearing of the floating disk, without any additional sealing element.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

List of Reference Symbols

| | |
|---|---|
| 10 | Shaft |
| 11 | Bearing comb |
| 20 | Bearing housing |

-continued

List of Reference Symbols

| | |
|---|---|
| 21 | Bearing collar |
| 22 | Lubricating oil supply line |
| 30 | Floating disk |
| 30A | Floating disk, bearing housing side (viewed in direction A) |
| 30B | Floating disk, bearing comb side (viewed in direction B) |
| 31 | Lubricating groove |
| 32 | Wedge surface |
| 33 | Latching surface |
| 34 | Segment of the profiled annular surface |
| 35 | Supply hole |
| $r_G$ | Annular width on the side of the bearing housing |
| $r_W$ | Annular width on the side of the bearing comb |
| $v_R$ | Relative speed of the floating disk with respect to the bearing comb |
| $v_S$ | Speed of the floating disk |
| $v_W$ | Speed of the bearing comb |

What is claimed is:

1. A hydrodynamic axial bearing for a rotatable shaft is mounted, comprising:
    a bearing housing;
    a floating disk arranged axially between the bearing housing and a bearing comb; and
    a lubricating gap bounded by a profiled annular surface and a sliding surface formed between the bearing housing and the floating disk, and the floating disk and the bearing comb, wherein each profiled annular surfaces includes plural wedge surfaces which each narrow the lubricating gap in a circumferential direction, wherein each lubricating gap formed by a profiled annular surface and a sliding surface on two sides of the floating disk have different geometric dimensions relative to one another.

2. The hydrodynamic axial bearing as claimed in claim 1, wherein each lubricating gap on each of the two sides of the floating disk has different radial dimensions.

3. The hydrodynamic axial bearing as claimed in claim 2, wherein two profiled annular surfaces which form the lubricating gap on both sides of the floating disk are each subdivided into a different number of segments, wherein one segment in each case includes one wedge surface.

4. The hydrodynamic axial bearing as claimed in claim 3, wherein one side of the floating disk is radially stepped with respect to the other side.

5. The hydrodynamic axial bearing as claimed in claim 4, wherein at least one supply hole is incorporated in the floating disk, wherein the at least one supply hole connects the two sides of the floating disk to one another.

6. The hydrodynamic axial bearing as claimed in claim 5, wherein the floating disk has radial lubricating grooves, and the at least one supply hole opens into a lubricating groove at least on one side of the floating disk.

7. The hydrodynamic axial bearing as claimed in claim 2, wherein the two profiled annular surfaces which form the lubricating gap on both sides of the floating disk have wedge surfaces of different design.

8. The hydrodynamic axial bearing as claimed in claim 2, wherein each profiled annular surface comprises:
    a wedge surface and a latching surface, and the two profiled annular surface which form the lubricating gap on both sides of the floating disk have a different area ratio from the latching surface to the wedge surface.

9. The hydrodynamic axial bearing as claimed in claim 1, wherein two profiled annular surfaces which form the lubricating gap on both sides of the floating disk are each subdivided into a different number of segments, wherein one segment in each case includes one wedge surface.

10. The hydrodynamic axial bearing as claimed in claim 1, wherein the two profiled annular surfaces which form the lubricating gap on both sides of the floating disk have wedge surfaces of different design.

11. The hydrodynamic axial bearing as claimed in claim 1, wherein each profiled annular surface comprises:
a wedge surface and a latching surface, and the two profiled annular surface which form the lubricating gap on both sides of the floating disk have a different area ratio from the latching surface to the wedge surface.

12. The hydrodynamic axial bearing as claimed in claim 1, wherein one side of the floating disk is radially stepped with respect to the other side.

13. The hydrodynamic axial bearing as claimed in claim 1, wherein at least one supply hole is incorporated in the floating disk, wherein the at least one supply hole connects the two sides of the floating disk to one another.

14. The hydrodynamic axial bearing as claimed in claim 13, wherein the floating disk has radial lubricating grooves, and the at least one supply hole opens into a lubricating groove at least on one side of the floating disk.

15. The hydrodynamic axial bearing as claimed in claim 13, wherein the at least one supply hole is directed at an angle radially outward.

16. An exhaust-gas turbocharger, comprising:
a rotatable shaft; and
a hydrodynamic axial bearing for the rotatable shaft, the hydrodynamic axial bearing including:
a bearing housing;
a floating disk arranged axially between the bearing housing and a bearing comb; and
a lubricating gap bounded by a profiled annular surface and a sliding surface formed between the bearing housing and the floating disk, and the floating disk and the bearing comb, wherein each profiled annular surfaces includes plural wedge surfaces which each narrow the lubricating gap in a circumferential direction, wherein each lubricating gap formed by a profiled annular surface and a sliding surface on two sides of the floating disk have different geometric dimensions relative to one another.

17. A floating disk for placement in a hydrodynamic axial bearing between a bearing housing and a shaft mounted to rotate in the bearing housing, the floating disk comprising:
a profiled annular surface with plural wedge surfaces on each of its two sides, each wedge surface being configured to narrow a lubricating gap between the floating disk and a sliding surface in a circumferential direction, wherein each lubricating gap formed by a profiled annular surface and a sliding surface on the two sides of the floating disk has different geometric dimensions relative to another of the lubricating gaps.

18. The floating disk as claimed in claim 17, wherein the two profiled annular surfaces are each subdivided into a different number of segments, wherein one segment in each case comprises one wedge surface.

* * * * *